US011155972B2

(12) United States Patent
Strømsvåg

(10) Patent No.: US 11,155,972 B2
(45) Date of Patent: Oct. 26, 2021

(54) SYSTEM FOR DEPLOYING AND COLLECTING ROAD STICKS

(71) Applicant: ROADTECH AS, Øydegard (NO)

(72) Inventor: Peder Kristian Strømsvåg, Øydegard (NO)

(73) Assignee: ROADTECH AS, Øydegard (NO)

( * ) Notice: Subject to any disclaimer, the term of this patent is extended or adjusted under 35 U.S.C. 154(b) by 13 days.

(21) Appl. No.: 16/633,615

(22) PCT Filed: Jul. 23, 2018

(86) PCT No.: PCT/NO2018/050198
§ 371 (c)(1),
(2) Date: Jan. 24, 2020

(87) PCT Pub. No.: WO2019/027331
PCT Pub. Date: Feb. 7, 2019

(65) Prior Publication Data
US 2020/0199833 A1   Jun. 25, 2020

(30) Foreign Application Priority Data

Aug. 4, 2017   (NO) .................................... 20171303

(51) Int. Cl.
*E01F 9/70*   (2016.01)
*B60P 1/00*   (2006.01)
(Continued)

(52) U.S. Cl.
CPC .................. *E01F 9/70* (2016.02); *B60P 1/00* (2013.01); *B65G 1/0464* (2013.01); *E04H 17/263* (2013.01); *E04H 17/265* (2013.01)

(58) Field of Classification Search
CPC .. E01F 9/70; B60P 1/00; B60P 1/5457; B60P 1/5461; B65G 1/0464; E04H 17/263;
(Continued)

(56) References Cited

U.S. PATENT DOCUMENTS 2,655,006 A   10/1953   Hoen et al.
2,776,110 A   1/1957    Hoistad
(Continued)

FOREIGN PATENT DOCUMENTS

DE   29620215 U1   2/1997
DE   29916824 U1   1/2000
(Continued)

OTHER PUBLICATIONS

International Search Report and Written Opinion dated Oct. 18, 2018 (PCT/NO2018/050198).

*Primary Examiner* — Glenn F Myers
(74) *Attorney, Agent, or Firm* — Alix, Yale & Ristas, LLP

(57) ABSTRACT

System for deploying and collecting road sticks. A loading frame is mounted on a vehicle and comprises a road stick depot. A stick collecting device is arranged on a first clamp in a stick handling frame. A stick-deployment device is arranged movable back and forth along a beam in the driving direction of the vehicle. The stick-deployment device comprises a funnel, rotational drives, a ground plate and drive means to move the stick-deployment device vertically. The system is arranged to deploy and collect road sticks while the vehicle is in motion.

15 Claims, 5 Drawing Sheets

(51) Int. Cl.
*B65G 1/04* (2006.01)
*E04H 17/26* (2006.01)

(58) Field of Classification Search
CPC ........... E04H 17/265; E02D 7/00; E02D 7/20;
E02D 7/22; E21B 7/022; E21B 7/028
See application file for complete search history.

(56) References Cited

U.S. PATENT DOCUMENTS

| | | | | |
|---|---|---|---|---|
| 3,703,934 | A | * | 11/1972 | Cartner ................. E04H 17/263 173/193 |
| 4,050,526 | A | * | 9/1977 | Deike ....................... E02D 7/10 173/27 |
| 4,410,050 | A | * | 10/1983 | Councell, Jr. ......... E04H 17/263 173/112 |

FOREIGN PATENT DOCUMENTS

| | | | |
|---|---|---|---|
| EP | 1388614 | A2 | 2/2004 |
| GB | 2322390 | A | 8/1998 |
| WO | 9109194 | A1 | 6/1991 |

* cited by examiner

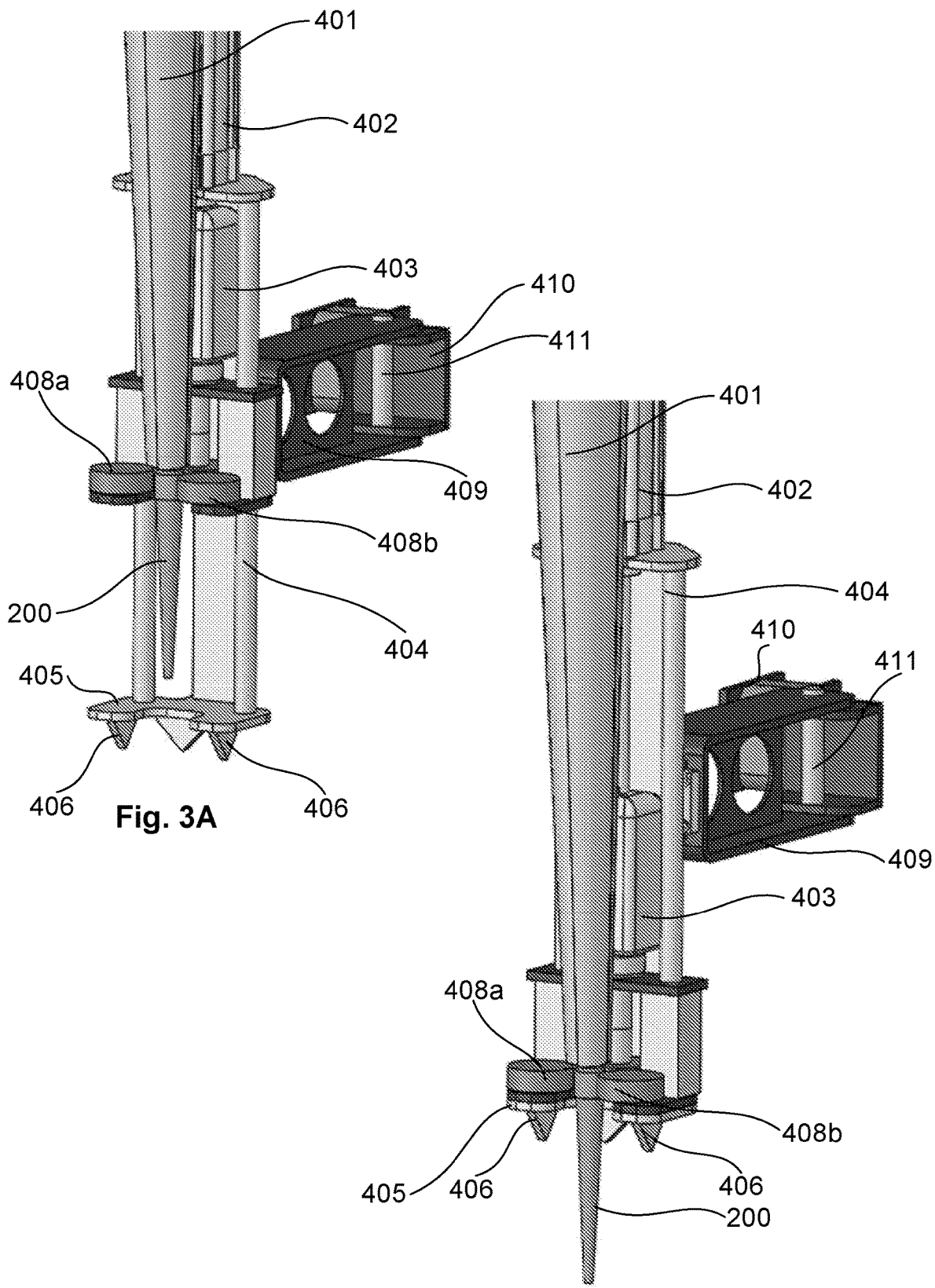

SYSTEM FOR DEPLOYING AND COLLECTING ROAD STICKS

BACKGROUND

The disclosed embodiments concern a system for deploying and collecting rod sticks, particularly sticks for snow-clearing of roads.

At present, a road stick is a plastic tube which is placed from a vehicle at the roadside at even intervals. First, a hole is made. Then, the stick is placed in the hole, whereupon the surrounding ground is stamped to make the stick stand steadily. The vehicle must stop for every stick being deployed, drive a few meters and then stop again to deploy the following stick. Collection of the road sticks either occurs in that an arm pulls the road stick upward and throws it upon the vehicle platform. The road sticks must be handled manually from the vehicle to storage. Moreover, the road sticks are produced from a plastic quality which cannot be recycled.

DE 296 20 215 U1 discloses a road stick having a cone-shaped lower end provided with threads to be able to be screwed down into the ground. One of the advantages mentioned is that there is no need for stamping the ground surrounding the stick, but will require that a hole is drilled in the ground in advance.

U.S. Pat. No. 2,776,110 discloses a machine for ramming fence poles down in to the ground. The machine is a specially designed wheel-going vehicle with a rack exhibiting means for holding and ramming a pole down into the ground, where the means is arranged movably in the driving direction of the vehicle. The machine is able to deploy fence poles while the vehicle is moving, without stopping. However, the machine is not arranged to collect fence poles.

GB 2 322 390 discloses a machine and a method of deploying fence poles, placed and supported in a hole in the ground. A rack is arranged on the platform of a truck. The rack is mounted slidably on a ramp to ram fence poles down in the hole in the ground. A supporting means having a foot is placed upon the ground to stabilize the edges of the hole in the ground.

U.S. Pat. No. 2,655,006 discloses a device for automatic deployment of poles in the ground. The device is mounted on a vehicle and exhibits a rack and hammer to ram the pole down into a hole in the ground.

WO 91/09194 discloses an apparatus for deployment of road sticks. The apparatus comprises a funnel, which in an active position narrows down toward an open bottom opening, and is arranged to collaborate with a sledge hammer when forming a hole in a roadside. Moreover, the apparatus exhibits a road stick depot and means to guide road sticks from the depot and to the funnel.

DE 299 16 824 discloses a ground sleeve having a reception section with screwable spindle for reception of poles and similar. A cone-shaped lower part of the ground sleeve is provided with an external thread to be able to be screwed down into the ground.

SUMMARY

Provided herein is a system for effective deployment and collection of road sticks. Embodiments of the system can be mounted to existing vehicles. The disclosed embodiments increase re-use of road sticks and make handling during deployment and collection more effective. Also provided is a road stick in a system of this type that can be piled down into the ground even in hard ground.

The disclosure concerns a system for deploying and collecting road sticks at the road side, wherein the system is arranged at a wheel-going vehicle, and comprises a road stick depot to accommodate numerous road sticks, and a stick-stacking device arranged movably back and forth along the driving direction of the vehicle and having means to deploy one single stick down into the ground while the vehicle is in continuous motion. The system comprises a loading ramp arranged to be pulled up onto a vehicle platform or trailer coupling on a truck, wherein the loading ramp exhibits a loading platform to accommodate numerous sticks, and do further exhibit an elongate stick handling frame having a first clamp mounted to a rear end of the loading ramp viewed in the driving direction, and a second clamp mounted to a forward end of the loading ramp viewed in the driving direction, wherein the first and second clamps are mounted pivotal to the loading ramp about an axis parallel with the driving direction. Moreover, the stick handling frame exhibits an elongate beam, and the stick-deployment device is mounted to the beam and is arranged to move along the stick handling frame by a slide guide and keep a stick accommodated within the same in a fixed position above the ground while the vehicle is moving. The stick handling frame do further exhibit a stick-fetching device mounted movable on the stick handling frame and arranged to exchange a road stick between the stick depot on the loading ramp and the stick-deployment device.

The stick fetching device exhibits a slide guide arranged slidable on a beam at the first clamp at the stick handling frame, and having gripping means to grip and hold a road stick and guide it further to a position above the stick-deployment device and drop it there.

The stick depot preferably exhibits a number of blister boxes in the form of hollow boxes located adjacent to each other, and having an upper surface provided with a number of holes, and a lower surface provided with a corresponding number of holes, in-line with the holes in the upper surface, each corresponding hole pair in the upper and lower surfaces, arranged to accommodate a stick extending substantially in a vertical direction.

The stick-stacker preferably exhibits a funnel to receive a stick from the stick depot and having a narrowing cross-section downward in direction of a rotary drive, arranged to hold and rotate a stick during deployment or collection of a road stick, and the stick-deployment device do further exhibit a ground support connected with a drive means, arranged to move the ground support in a vertical direction during deployment or collection of a road stick.

The ground support do in its lower end preferably exhibit a support plate having a substantially horizontal surface and with a recess to receive a stick.

The underside of the support plate does advantageously exhibit one or more spikes, arranged to keep the stick-deployment device steadily in the ground.

A stick is included in the system, wherein the stick exhibits an elongate body having a con-shaped lower end, wherein the external surface of the cone-shaped lower end is provided with threads. The area between the elongate body and the lower end is provided with a cogging for engagement with the rotational drives on the stick-deployment device, and the apex of the con-shaped lower end is formed as a blade serving as a drill. The cogging in the periphery of the road stick including the blade provide for an effective piling of the road stick into the ground.

BRIEF DESCRIPTION OF THE DRAWINGS

In the following, the invention is described in further detail with reference to drawings, where FIG. 3A shows the road stick-deployment device with a road stick ready for deployment, FIG. 3B is a drawing similar to FIG. 3A, but where the road stick has been screwed down into the ground.

DETAILED DESCRIPTION

Figure 1:
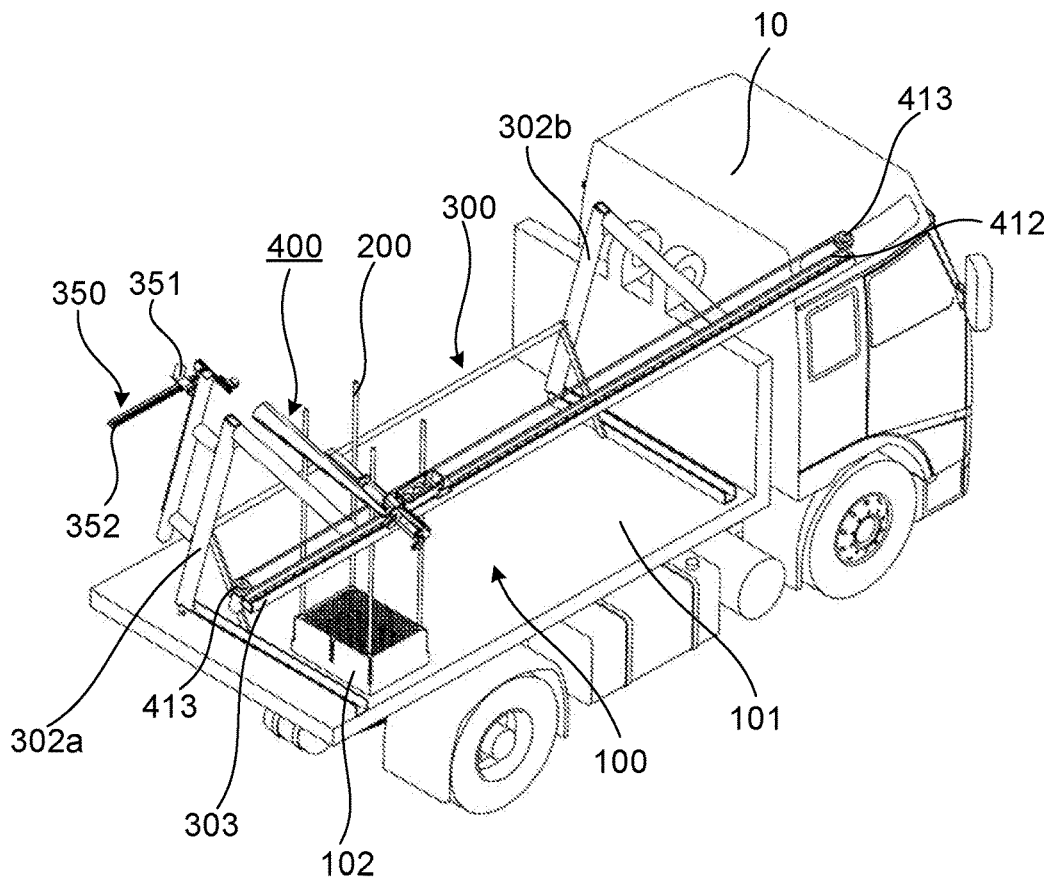
FIG. 1 shows a truck in perspective from behind, having an embodiment of the disclosed system loaded with road sticks, on its way to deploy the road sticks.

FIG. 1 shows the disclosed system arranged on a truck 10 in a transport position. The system comprises a loading frame 100 with a loading platform 101. Numerous blister boxes 102 are arranged on the loading platform 101 and accommodate a number of road sticks 200 to be deployed in the roadside. A stick handling frame 300 is attached to the loading platform 101 and has means 304 for collecting road sticks from the blister boxes 102 and deploying them in the roadside with a stick-deployment device 400. The stick handling frame 300 exhibits an elongate beam 303 with a carrier which keeps the stick-deployment device 400 movable back and forth along the beam, between a forward position close to the cab, and a rear position close to the rear part of the truck. The truck handling frame 300 do further exhibit an L-shaped first (rear) clamp 302a and a second (forward) clamp 302b, wherein one end of the respective clamp is attached pivotal to the loading platform 101 between a transport position where the clamps 302a, 302b with the accompanying carriers and stick-deployment device 400 are pivoted upward from the loading platform, and an operating position where the clamps 302a, 302b are settled down and resting on the loading platform 101 where the elongate clamp and the carrier extend horizontally just above the ground.

A stick-collecting device 350 is mounted to the top of the first clamp and exhibits a gripping device 351 attached slidably to a rail 352. The collecting device is further connected to a drive means and controller (not shown).

Figure 2:
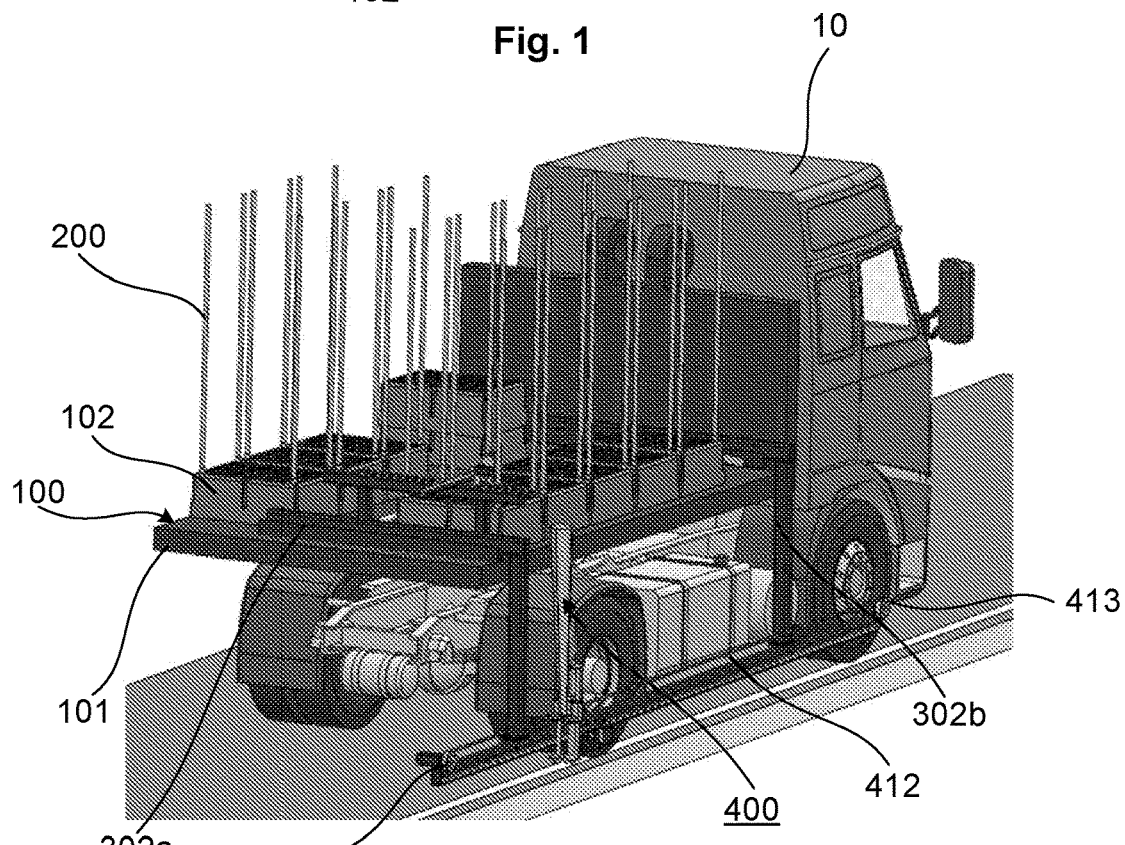
FIG. 2 is a drawing similar to FIG. 1, but during deployment of the road sticks.

FIG. 2 shows the system in the operating position where the clamps 302a, 302b are settled down and rest upon the loading platform 101. The main part of the road sticks 200 is here removed for simplicity.

Figure 3:
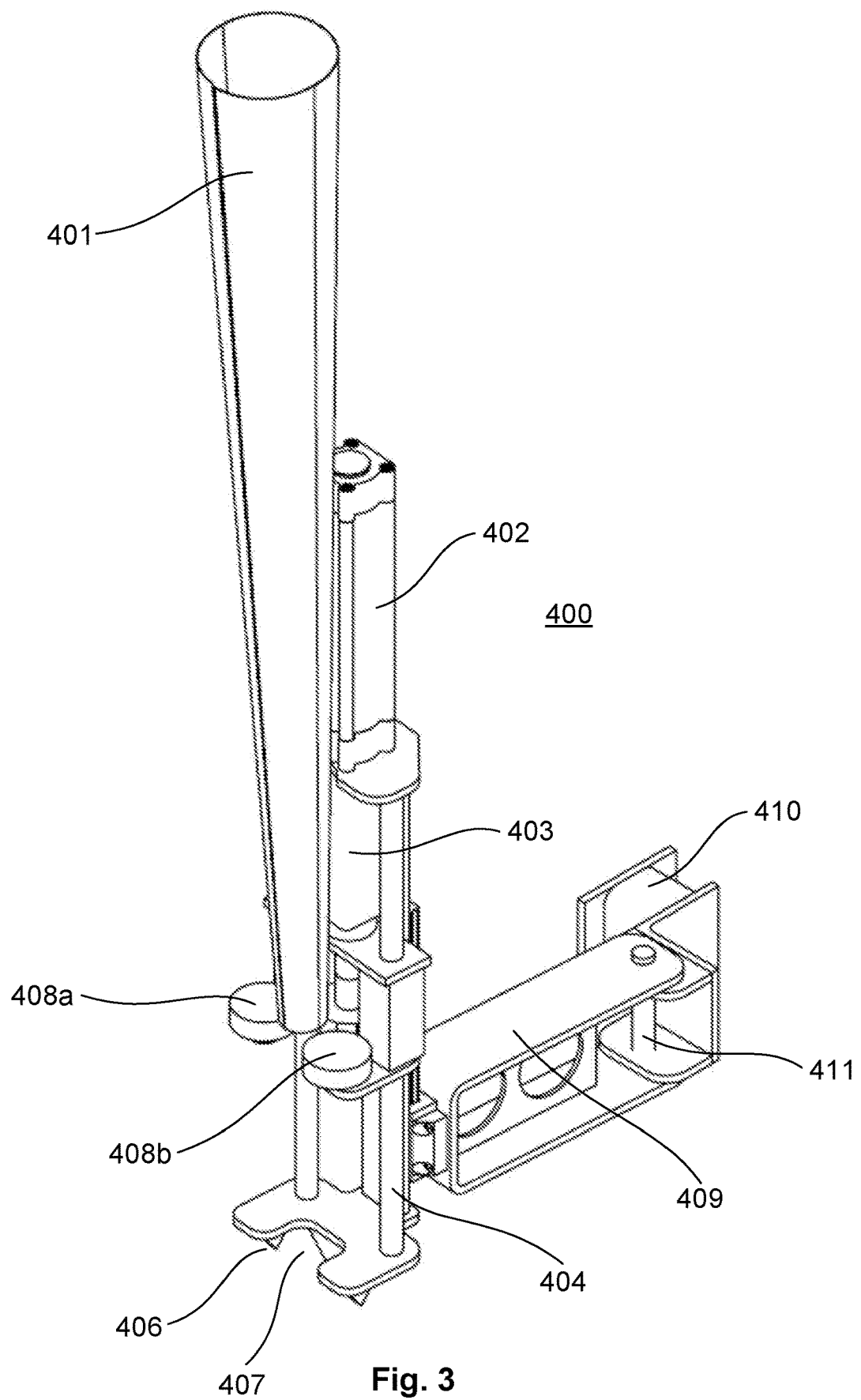
FIG. 3 shows a road stick-deployment device in perspective.

FIG. 3 shows the stick-deployment device 400 with a vertically extending funnel 401 with an inlet in the top to receive a road stick 200. A drive- and holding device is arranged below the lower end of the funnel 401, arranged to clamp and hold a road stick 200 between a first rotational drive 408a and a second rotational drive 408b. A ground support in form of a plate 405 is attached movable together with the funnel in the vertical direction by means of a hydraulic cylinder 402 via cylinder rods 404. The ground support 405 exhibits a recess 407 for accommodation of a road stick (not shown). The underside of the ground support 405 is preferably provided with one or more spikes 406 to provide a more stable support on the ground when the plate is arranged upon the ground. A drill hammer 403 is mounted to the rods 404 to assist in driving a road stick down into the ground together with rotation of the road stick with the drive- and holding device 408a, 408b. The stick-deployment device 400 is attached to the carrier via an articulated bracket 409, 410 which is pivotal in the horizontal plane about a pivot 411.

During deployment of road sticks, the truck drives with constant speed, where the carrier (not shown) guides the stick-deployment device 400 forward to the forward end of the beam 303. A road stick 200 has been fetched from a blister box 102 on the loading platform 101 and is ready for deployment into the roadside. This position is illustrated in FIG. 3A. In FIG. 3B the road stick has been deployed down into the ground in the roadside by rotation of the rotational drives 408a, 408b, and the drill hammer 403, whereas the stick-deployment device 400 has been moved downward by means of the hydraulic cylinder 402.

Figure 4:
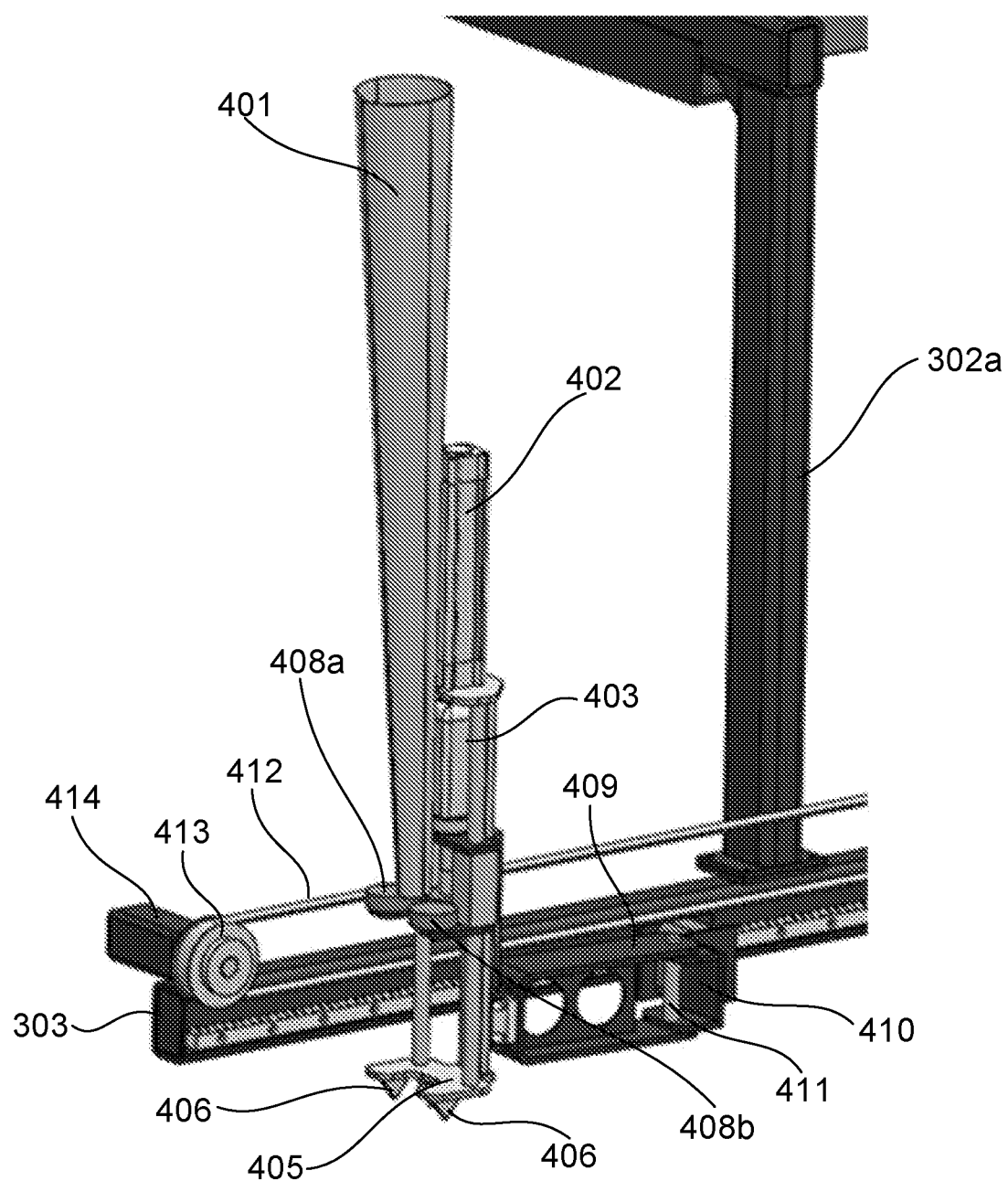
FIG. 4 shows the road stick-deployment device in perspective mounted on a slide.

FIG. 4 shows the stick-deployment device 400 mounted to the beam 303 via the bracket 409, 410 and a carrier mechanism in the form of an endless ribbon 412 attached around two sprockets 413 driven to rotate by drive means 414.

Figures 5, 5A, 5B:
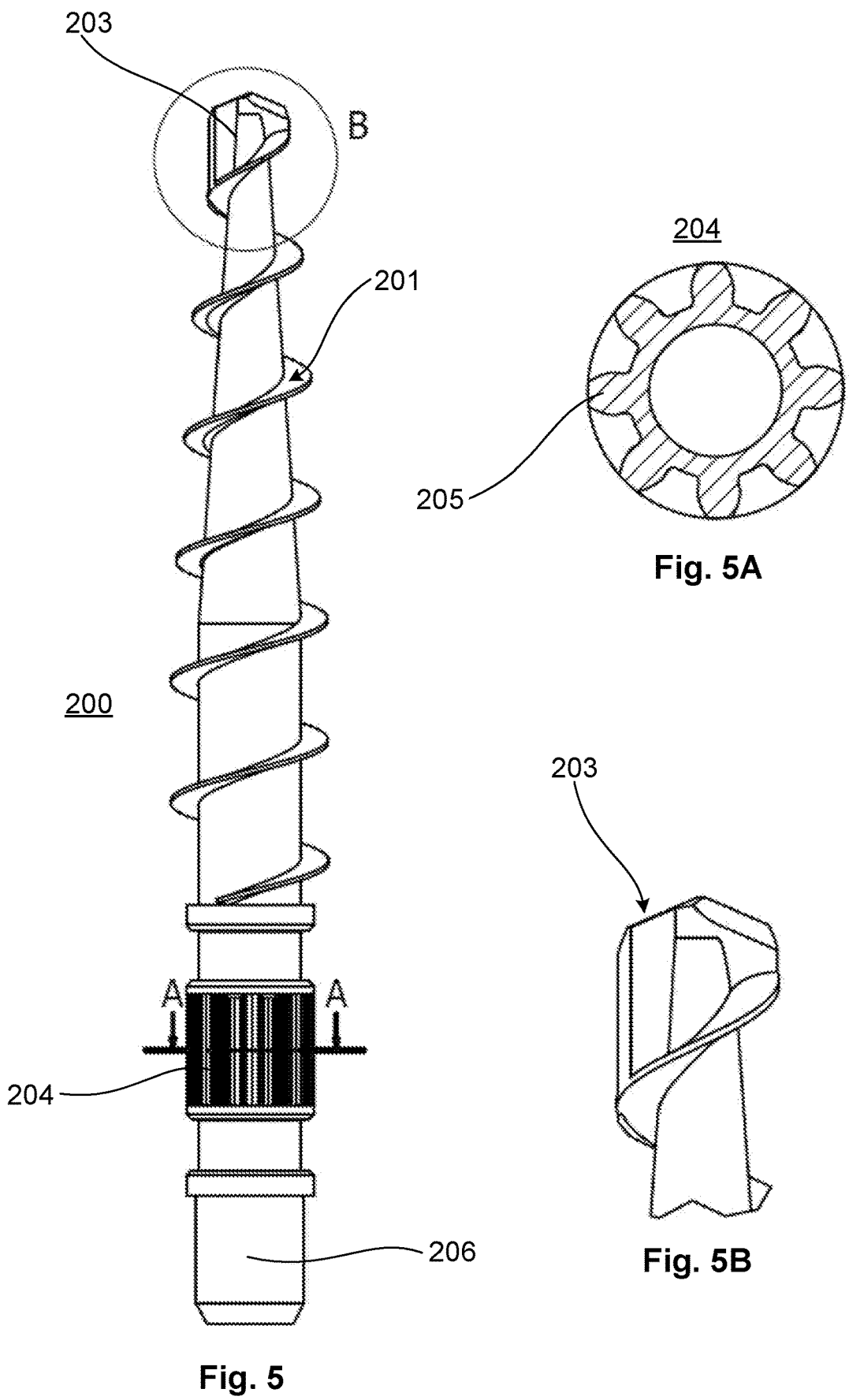
FIGS. 5, 5A and 5B show details of a drill-part of a road stick.

FIG. 5 shows the apex of a road stick 200 with a cone-shaped end section and formed with a blade 203 in the apex. The road stick is preferably made of recycled plastic. The external surface of the cone-shaped end section and a part of the cylinder shaped road stick are provided with threads 201. FIG. 5A is a cross-section through the road stick along the line A-A in FIG. 5. Numerous teeth 205 are formed along the periphery of a section adjacent to the threaded end section of the road stick to engage with the rotational drives 408A and 408B. FIG. 5B illustrates the blade 203 in further details.

Technical Effect

The disclosed system has several advantages. Deployment of road sticks from a vehicle in constant motion provides increased traffic security and less wear on vehicles. Moreover, the deployment of road sticks is far more effective than the present methods where holes are drilled in the ground before the road stick is deployed down into the hole and the ground is compacted around the road stick. The system can, with all its components, be pulled up and attached on a truck without the need for special modifications of the truck. The road stick depot in the form of blister boxes with closely arranged holes offers large storage capacity. For example, can 2 340 road sticks on 10 blisters be transported, each blister having 13×18 holes and totally 234 holes per blister. The thread-shaped end of the road stick ensures that the road stick is better secured in the ground than the prior art road sticks. Moreover, the threads make the need for drilling a hole in the ground in advance obsolete. A road stick of recycled plastic can be re-melted to new road sticks at the end of its service life.

During collection of road sticks, the stick-deployment device is replaced by a stick collection device (not illustrated). The stick collection device is a device similar to the stick-deployment device 400 with a funnel with open ends and rotational drives arranged below the lower opening of the funnel top grip around a road stick to be collected, and rotate it in opposite direction of the rotational direction for deployment of road sticks, thus unscrewing it up from the ground. Moreover, the stick collecting device is connected with an elevating/lowering device, so that the funnel can be lowered down over a road stick to be collected. The rotational drives on the stick collecting device are preferably inclined with rotational direction in the contact point between rotational drive and road stick in direction upward, so that rotation of the road stick both screws it up from the ground and guides it up into the funnel.

As soon as toe road stick has been released from the ground, it is guided back to the road stick depot 102 by the same components used for deployment of the road sticks while the vehicle is in motion on its way to the next stick to be collected.

The invention claimed is:

1. A system for deployment and collection of road sticks (200) in the roadside along a road arranged at a wheel-going vehicle (10) traveling in a driving direction, comprising
    a road stick depot (102) configured to accommodate multiple road sticks (200), and
    a stick-deployment device (400) configured to pile one single of said road sticks (200) down into the ground while the vehicle (10) is in continuous motion and being movable back and forth in the driving direction of the vehicle (10),
    a loading frame (100) having a rear end and a front end arranged to be positioned on a vehicle platform or trailer coupling on the vehicle (10), the loading frame (100) having a loading platform (101) for accommodation of multiple sticks (200) and an elongate stick handling frame (300) with a first clamp (302a) mounted to the rear end of the loading frame (100) and a second clamp (302b) mounted to the front end of the loading frame (100), wherein
    the first and second clamps (302a, 302b) are attached pivotally to the loading frame (100) about an axis parallel with the driving direction,
    the stick handling frame (300) includes an elongate beam (303), the stick-deployment device (400) being mounted to the beam (303) and configured to slidably move along the stick handling frame (300) and hold a stick (200) of said road sticks in a fixed position above the ground while the vehicle (10) is in motion, and
    the stick handling frame (300) further includes a stick collecting device (350) mounted movable to the stick handling frame (300) configured to exchange a road stick (200) of said road sticks between the stick depot (102) on the loading frame (100) and the stick-deployment device (400).

2. The system of claim 1, wherein the stick depot (102) comprises multiple hollow blister boxes placed adjacent to one another, each blister box having an upper surface with numerous holes and a lower surface with a corresponding number of holes with each hole in the lower surface aligned with a hole of said numerous holes in the upper surface to form a hole pair, each hole pair configured to accommodate a stick (200) of said road sticks extending substantially in a vertical direction.

3. The system of claim 2, wherein the stick-deployment device (400) has a funnel (401) for accommodation of a stick (200) of said road sticks from the stick depot (102), the funnel (401) having a cross-section that narrows in a downward direction toward a rotary drive (408a, 408b), the rotary drive (408a, 408b) configured to hold and rotate a stick (200) of said road sticks during deployment or collection of a road stick (200), and the stick-deployment device (400) further comprises a ground support configured to move the ground support in a vertical direction during deployment or collection of a road stick (200).

4. The system of claim 1, wherein the stick-deployment device (400) has a funnel (401) for accommodation of a stick (200) of said road sticks from the stick depot (102), the funnel (401) having a cross-section that narrows in a downward direction toward a rotary drive (408a, 408b), the rotary drive (408a, 408b) configured to hold and rotate a stick (200) of said road sticks during deployment or collection of a road stick (200), and the stick-deployment device (400) further comprises a ground support configured to move the ground support in a vertical direction during deployment or collection of a road stick (200).

5. The system of claim 4, wherein the ground support has a lower end with a support plate (405) having a substantially horizontal surface and a recess (407) for accommodation of a stick (200) of said road sticks.

6. The system of claim 3, wherein the ground support has a lower end with a support plate (405) having a substantially horizontal surface and a recess (407) for accommodation of a stick (200) of said road sticks.

7. The system of claim 5, wherein the underside of the support plate (405) exhibits one or more spikes (406) configured to hold the stick-deployment device (400) in the ground.

8. The system of claim 1, wherein the stick collecting device (350) is arranged in a slidable configuration on a second beam at the first clamp (302a) of the stick handling frame (300) configured to hold a road stick (200), guide it to a position above the stick-deployment device (400), and drop it.

9. The system of claim 2, wherein the stick collecting device (350) is arranged in a slidable configuration on a second beam at the first clamp (302a) of the stick handling frame (300) configured to hold a road stick (200), guide it to a position above the stick-deployment device (400), and drop it.

10. The system of claim 4, wherein the stick collecting device (350) is arranged in a slidable configuration on a second beam at the first clamp (302a) of the stick handling frame (300) configured to hold a road stick (200), guide it to a position above the stick-deployment device (400), and drop it.

11. The system of claim 5, wherein the stick collecting device (350) is arranged in a slidable configuration on a beam at the first clamp (302a) of the stick handling frame (300) configured to hold a road stick (200), guide it to a position above the stick-deployment device (400), and drop it.

12. The system of claim 7, wherein the underside of the support plate (405) exhibits one or more spikes (406) configured to hold the stick-deployment device (400) in the ground.

13. The system of claim 4, wherein the road stick (200) has an elongate body (206) and a lower conical end that is threaded on an external surface (201), an area between the elongate body (206) and the lower end is provided with a cogging (205) for engagement with the rotary drives (408a, 408b) on the stick-deployment device (400), and conical lower end has an apex (203) formed as a blade for drilling.

14. The system of claim 5, wherein the road stick (200) has an elongate body (206) and a lower conical end that is threaded on an external surface (201), an area between the elongate body (206) and the lower end is provided with a cogging (205) for engagement with the rotary drives (408a, 408b) on the stick-deployment device (400), and conical lower end has an apex (203) formed as a blade for drilling.

15. The system of claim 7, wherein the road stick (200) has an elongate body (206) and a lower conical end that is threaded on an external surface (201), an area between the elongate body (206) and the lower end is provided with a cogging (205) for engagement with the rotary drives (408*a*, 408*b*) on the stick-deployment device (400), and conical lower end has an apex (203) formed as a blade for drilling.

\* \* \* \* \*